No. 661,742. Patented Nov. 13, 1900.
H. & J. S. LETORD.
CIRCUIT CONTROLLER FOR ELECTRIC ENGINES.
(Application filed Feb. 27, 1900.)
(No Model.) 3 Sheets—Sheet 1.
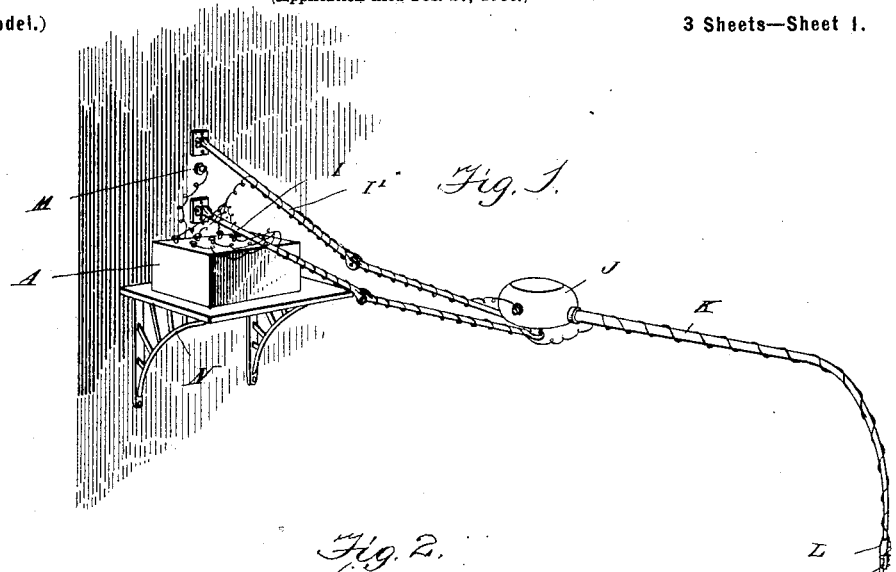
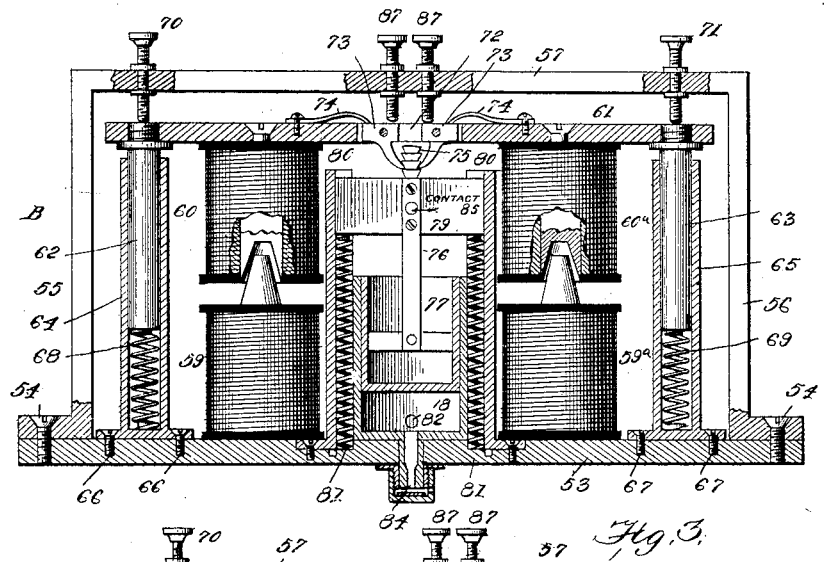
Witnesses Inventors,
H. Letord
J. S. Letord,
by
Attorneys

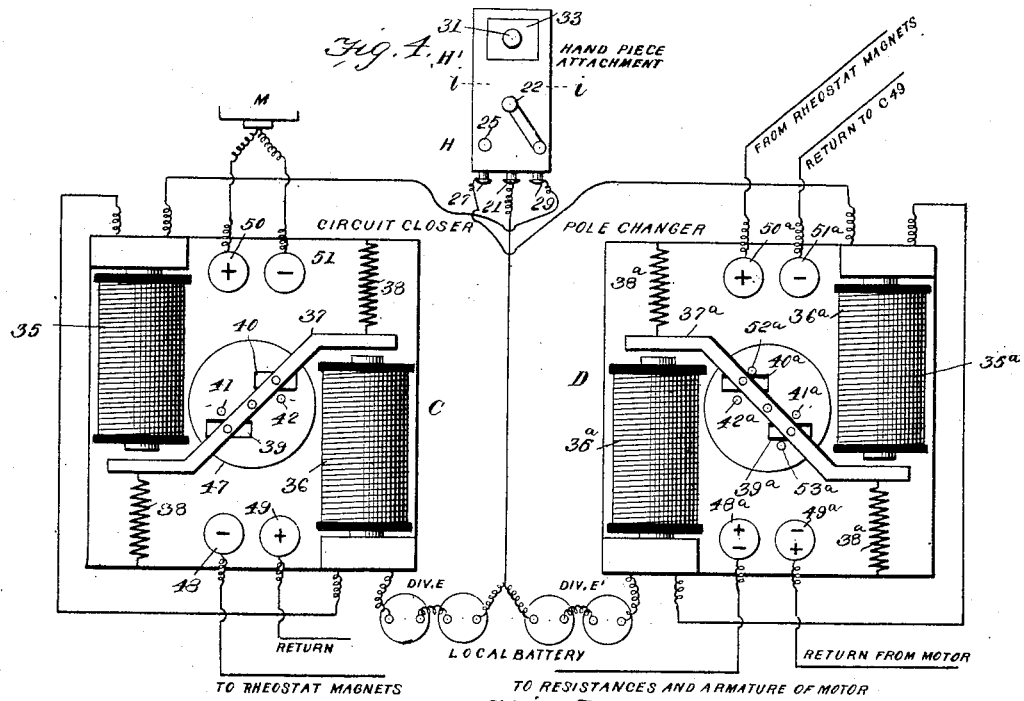

No. 661,742. Patented Nov. 13, 1900.
H. & J. S. LETORD.
CIRCUIT CONTROLLER FOR ELECTRIC ENGINES.
(Application filed Feb. 27, 1900.)
(No Model.) 3 Sheets—Sheet 3.
Fig. 11.
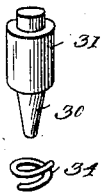
Fig. 12.
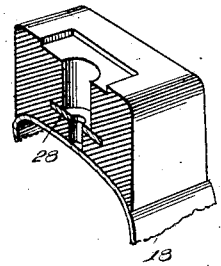
Fig. 13. Fig. 16.
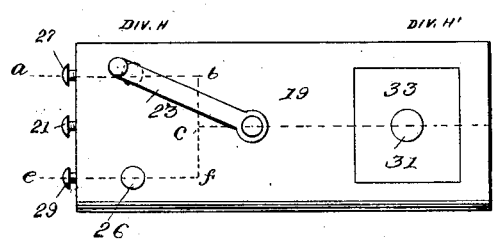
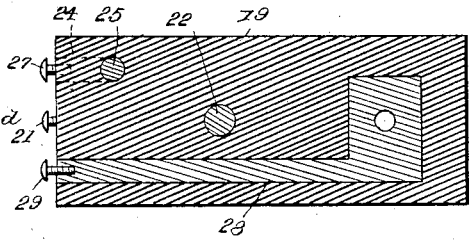
Fig. 14. Fig. 15.
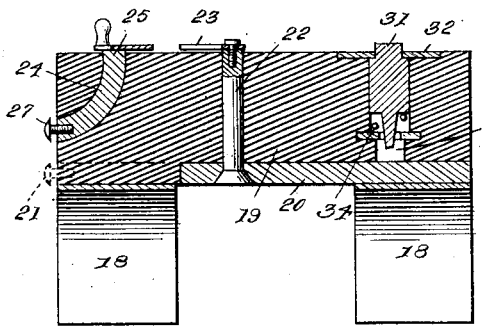
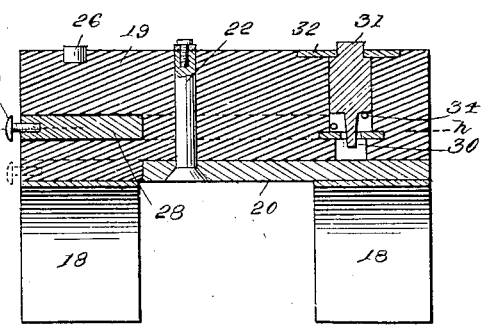
Witnesses
Inventors
H. Letord,
J. S. Letord,
by Dimmick
Attorneys
THE NORRIS PETERS CO., PHOTO-LITHO., WASHINGTON, D. C.

UNITED STATES PATENT OFFICE.

HENRI LETORD, OF ORLANDO, FLORIDA, AND JOSEPH S. LETORD, OF KANSAS CITY, MISSOURI.

CIRCUIT-CONTROLLER FOR ELECTRIC ENGINES.

SPECIFICATION forming part of Letters Patent No. 661,742, dated November 13, 1900.

Application filed February 27, 1900. Serial No. 6,735. (No model.)

*To all whom it may concern:*

Be it known that we, HENRI LETORD, residing at Orlando, in the county of Orange and State of Florida, and JOSEPH S. LETORD, residing at Kansas City, in the county of Jackson and State of Missouri, have invented a new and useful Circuit-Controller for Electric Engines, of which the following is a specification.

This invention relates to circuit-controllers for electric motors or engines, and particularly to that class of such devices as are used by dentists and surgeons, the object of the invention being to provide an improved circuit-controller for starting, stopping, reversing, and regulating the speed of surgico-dental electrical engines.

With this object in view the invention consists in the improved construction, arrangement, and combination of appliances for the purpose of starting, stopping, reversing, and regulating the speed of a surgico-dental electric engine by means of finger-pressure at the handpiece, all of which will be hereinafter fully described, and afterward specifically pointed out in the appended claims.

In order to enable others skilled in the art to which our invention appertains to make and use the same, we will now proceed to describe its construction and operation, reference being had to the accompanying drawings, forming part hereof, in which—

Figure 1 is a perspective view of a surgico-dental electric engine mounted on an adjustable bracket connected up with a circuit-controller constructed in accordance with our invention and with an incandescent electric-light plug, the controller, local batteries, rheostat, resistance-coils, main-circuit closer, and pole-changer being boxed. Fig. 2 is a view of the rheostat or resistance-controller, partly in elevation and partly in vertical section, being shown in circuit with the main line. Fig. 3 is a view of the same in rear elevation. Fig. 4 is a view illustrating the handpiece attachment, the main-circuit closer, and the pole-changer, together with a diagrammatic illustration of their connections. Fig. 5 is a detail view of the contact-plate of the circuit-closer. Fig. 5ª is a detail view of the contact-plate of the pole-changer. Fig. 6 is a rear view of the armature of the main-circuit closer. Fig. 7 is a rear view of the armature of the pole-changer. Fig. 8 is a diagrammatic view illustrating the main-line circuit. Fig. 9 is a detail top plan view of part of the armature of the rheostat or resistance-controller. Fig. 10 is a detail view in elevation of parts of the rheostat or resistance-controller in different positions from those illustrated in Fig. 2. Fig. 11 is a perspective view of the handpiece attachment. Fig. 12 is a perspective view of the parts of the handpiece attachment detached from each other, but in their proper relative position. Fig. 13 is a top plan view of the handpiece attachment. Fig. 14 is a vertical sectional view of the handpiece attachment on the plane indicated by the dotted line $a\ b\ c\ d$ in Fig. 13. Fig. 15 is a vertical sectional view on the plane indicated by the dotted line $e\ f\ c\ d$ of Fig. 13. Fig. 16 is a horizontal sectional view of the handpiece attachment on the plane indicated by the dotted line $g\ h$ of Figs. 14 and 15 looking downward.

Like numerals and letters of reference mark the same parts wherever they appear in the several figures of the drawings.

Referring to the drawings by letters and numerals, A in Fig. 1 indicates a box, which in practical operation will contain the rheostat or resistance-controller B, Figs. 2 and 3, and the main-circuit closer C, the pole-changer D, and the local batteries, (divisions E and E',) as shown in Fig. 4, and resistance-coils F F' F², as shown in Fig. 3.

The handpiece attachment G (shown in Figs. 4 and 11 to 16) is a double circuit-closing device operated by the operator by the hand grasping the ordinary handpiece and for convenience of reference will be divided into divisions H' and H, the division of G including that part above the dotted line $i\ i$ in Fig. 4 being designated as division H' and that part below that line in Fig. 4 or to the left of it in Fig. 13 as division H.

I I', Fig. 1, indicate the arms of any ordinary adjustable bracket for supporting any approved form of surgico-dental electric engine J, from which extends the usual flexible cable K, carrying at its outer end the usual handpiece L, to which our improved handpiece attachment G is detachably secured by means hereinafter described.

M indicates the usual incandescent electric-light plug, and N N any ordinary bracket for supporting the box A.

The construction of the handpiece attachment will first be described, referring especially to Figs. 11 to 16 and incidentally to other figures of the drawings.

17 18 indicate curved springs for clasping the handpiece L, said springs being secured to the under face of a block 19 of hard rubber or other suitable non-conducting material and connected by a metal strip 20, having a threaded opening in one end to receive a binding-screw 21. Secured to the strip 20 is a rod 22, projecting upward through and slightly above the block 19, a switch-lever 23 being pivotally mounted on its projecting end.

24 indicates a curved rod fixed in the block 19, projecting above it at 25 to serve as a contact-point for switch-lever 23, a dummy point 26 also projecting above block 19 to receive switch-lever at the opposite end of its throw when the circuit is broken. The curved rod 24 also extends to the end of block 19 and has a threaded opening to receive a binding-screw 27. By this switch mechanism the local-battery circuit, the wires of which are secured by binding-screws 21 and 27, may be opened or closed, as hereinafter described, such switch mechanism forming division H of the handpiece attachment, as before set forth, and the circuit being from division E' of the local battery to operate the pole-changer D, the current passing from binding-post 21, metal strip or bar 20, rod 22, switch-lever 23, and curved rod 24 to binding-screw 27 and to the pole-changer, as shown in Fig. 4.

28 indicates another metal strip or bar passing from the front of the block 19 backward into the block, being provided with a threaded opening in its front end to receive a binding-screw 29 and flattened and extended laterally at its rear end, crossing a vertical recess 30 in the block 19 and provided with an opening to receive the inner end of a push-button 31, seated in said opening. The push-button is thicker in the middle than at either end, the upper end extending through a central opening 32 in a cover-plate 33, so as to be accessible to the fingers of the operator while holding the handpiece L. The shoulders at the lower end of the body bear upon a spring 34, coiled around the lower end and resting on strip or bar 28, thus normally holding the push-button on its outer position with its inner end out of contact with the metal strip 20. By pressing upon the push-button the local-battery circuit from division E of the battery, Fig. 4, is closed to operate main-circuit closer C, the current passing from binding-post 21 through metal strip or bar 20, push-button end 30, strip or bar 28 to binding-screw 29 and main-circuit closer, as shown in Fig. 4.

The main-circuit closer, as illustrated at C on the left of Fig. 4, comprises two electric magnets 35 and 36, arranged at opposite sides of a suitable support and in reversed positions, and a soft-iron bar armature 37 is centrally pivoted to the support in position to be attracted at its opposite ends by the magnets. A spring 38 at each end normally holds the armature away from the magnets. Projecting through the armature on opposite sides of the center are the hard-rubber blocks 39 40, faced with platinum on one side, so as to form contact with pins 41 42, projecting through the support in the path of movement of the armature when attracted by the magnets. From the platinum faces of blocks 39 and 40 metal pins 43 and 44, Fig. 6, project through the rear side of the armature and contact with curved plates 45 46, Fig. 5, set in a circular plate 47, of non-conducting material, secured to the rear of the support and connected up in the main line with binding-posts 48 49 at the top of the support. The pins 41 and 42 are connected up in the main line with binding-posts 50 51, the posts 48 and 50 in this arrangement being marked +, or positive, and the posts 49 and 51 —, or negative. When the push-button 31 is forced into contact with bar 20, as before stated with reference to the handpiece attachment, the circuit from division E of the local battery is completed through division H' of the handpiece attachment and the magnets 35 and 36. The magnets being thus energized will attract the armature 37, bringing the platinum faces of the blocks 39 40 into contact with pins 41 42 and closing the main-line circuit from post 50 through pin 41, platinum of block 39, pin 44, and curved plate 46 to post 49 and from post 51 through pin 42, platinum of block 40, pin 43, and curved plate 45 to post 48.

The pole-changer D (illustrated on the right of Fig. 4) is provided with magnets 35ª 36ª, armature 37ª, springs 38ª, hard-rubber blocks 39ª 40ª, pins 41ª 42ª, pins 43ª 44ª, curved contact-plates 45ª 46ª, circular non-conducting plate 47ª, and binding-posts 48ª 49ª 50ª 51ª, all arranged in the same relation as the corresponding parts of the main-circuit closer C, the blocks 39ª 40ª being platinum-faced on both sides to contact in one position with pins 41ª 42ª in one position and with similar pins 52ª 53ª in the opposite position of the armature. The posts 50ª and 51ª are marked + and —, respectively, as in the main-circuit closer; but the posts 48ª and 49ª are marked, respectively, ± and ∓. The pin 41ª is electrically connected with pin 52ª and the pin 42ª with pin 53ª, so that when the circuit from division E' of the local battery is closed by throwing the switch-lever in division H of the handpiece attachment the local current will energize magnets 35ª 36ª, which in turn will attract armature 37ª, causing contact of the pins 41ª and 42ª. The main line will then be closed from post 50ª, pin 41ª, the platinum of block 39$^a$, pin 44$^a$, curved plate 46$^a$, post 49$^a$, post 51$^a$, pin 42$^a$, platinum of block 40$^a$, pin 43$^a$, curved plate 45$^a$ to post 48$^a$, and the direction through the armature will be reversed, thus reversing the motor and tool.

The rheostat or resistance-controller comprises a frame consisting of a bottom or base plate or bar 53, to which is secured by screws 54 a second bar or plate forming sides 55 56 and top 57. In this construction, as shown in Figs. 2 and 3, 59 59$^a$ 60 60$^a$ indicate electromagnets connected up in series with the motor itself. These magnets are made in sections, with their cores telescoping, so as to get the maximum strength of pull.

61 indicates the armature of both magnets, and 62 63 rods depending therefrom into cylinders 64 65, mounted on the base-plate 53 by screws 66 67 and containing springs 68 69, bearing upward under rods 62 63, with a normal tendency to hold the armature at its uppermost position, this position being determined adjustably by stop-screws 70 71, threaded downward through the top 57 of the frame. In the center of the armature is a slot 72, in which are pivotally mounted two pawls 73 73, which are held normally in engagement by springs 74 with one of a series of grooves 75 in a rod or plunger 76, secured at its lower end by means of a cross-bar in a closed bottom cylinder 77, mounted to slide in an outer cylinder 78, secured to the base. A plate 79, secured to the bar 76, is guided at its ends in grooves in brackets 80 80, secured to the base outside of the cylinders. Springs 81 81 are provided in the grooves of brackets 80, under the plate 79, having a normal tendency to force the plate, plunger-rod, and cylinder 77 upward. The cylinder 78 is provided with an air-inlet pipe 82, having valve 83, Fig. 3, to regulate the inflow, and with an outlet-pipe with a valve 84 in its bottom. Projecting from the rear of plate 79 is a contact-point 85, which by reason of the raising and lowering of the plunger and plate may be brought into contact with either of the contact-points $p'$, $p^2$, $p^3$, $p^4$, or $p^5$, projecting from an upright plate 86, secured in the rear of plate 79. The contact-point 85 is on the main-line circuit, as are also points $p'$ and $p^2$, the two last named being in electric connection at $q$, and when the point 85 is in contact with either $p'$ or $p^2$ the current passes through resistances F, F', and F$^2$. When point 85 contacts with $p^3$, the current only passes through resistances F' and F$^2$. When 85 is in contact with $p^4$, the current passes through only one resistance, F$^2$, and when 85 and $p^5$ are in contact no resistance is encountered. Thus four different speeds may be given to the motor, and it will be obvious that the number may be increased or diminished, as may be desired.

To accomplish the lowering of the contact-point 85, the circuit-closer C is operated, cutting off the main current, which, as before stated, passes through the magnet-coils, and each time this is done the armature 61, released from the magnets, is raised by the springs, causing the pawls 73 73 to engage in the next higher groove 75. The current being immediately turned on again the magnets are energized, drawing the armature down and lowering contact-point 85 one step, as from $p'$ to $p^2$, $p^2$ to $p^3$, &c., as the case may be. The points $p'$ and $p^2$ being electrically connected the first step (from $p'$ to $p^2$) makes no change, but each succeeding step gives a higher speed.

When the motor is stopped by opening the circuit, the springs 68 and 69 carry the armature 61 to its highest point, until the stop-screws 87 87 strike the inner corners of pawls 73 73 and release their points from engagement in grooves 75, thereby allowing the plunger 76, plate 79, and cylinder 77 to be raised by springs 81 ready for the next operation of the rheostat.

The diagrammatic illustration in Fig. 8 shows the main-line circuits from the electric-light plug M. From this it will be seen that when contact is made with button 30 against rod 20 of division H' of the handpiece attachment G the local circuit from division E of the battery will be closed, energizing the magnets 35 and 36 of main-circuit closer C and making contact through armature 37 to supply main-line current at 48. From this post current passes through the electromagnets 59, 59$^a$, 60, and 60$^a$, after which it divides and forms a field-circuit and an armature-circuit. The former simply makes the circuit of the motor-field and returns to 49. The latter passes through one side of the pole-changer (either 50$^a$ to 48$^a$ or 50$^a$ to 49$^a$ when reversed) to contact 85, thence to $p'$, $p^2$, $p^3$, $p^4$, or $p^5$, thence through more or less of the resistance F F' F$^2$, thence through the armature of the motor, thence back through the other side of the pole-changer and main-circuit closer (49 to 51) and to the plug M.

When the circuit of division H of the handpiece attachment G is closed, the main-line current will be sent through the motor, through the magnets of the rheostat B, and through all of the resistances F F' F$^2$. As the magnets of the rheostat are energized their armature will be pulled down, causing contact 85 to engage contact $p^2$; but as $p'$ and $p^2$ are electrically connected the current will still pass through all of the resistances and no change of speed will occur. By opening and quickly closing the main-line circuit the armature of the rheostat will rise under action of its supporting-springs 68 69 and the pawls 73 engage a higher notch 75, when the quickly reënergized magnets will pull the armature and plate 79 down, bringing contact 85 to contact $p^3$, cutting out resistance F, and giving the next (increased) speed to the motor. Repetitions of this opening and quickly closing of the main-line circuit will bring contact 85 successively in engagement with $p^4$, cutting out resistance F', and $p^5$, cutting out resistance $F^2$, supplying the full strength of current to the motor and giving its highest speed.

From the foregoing it will be seen that we have provided a complete, simple, and effective combination of appliances specially adapted for ready application to a surgico-dental electric engine, although capable of use with other forms of electric engines or motors, whereby by simple manual or finger action, without changing the position of the handpiece or moving the hand therefrom, the operator is enabled to start, stop, reverse, or change the speed of the engine. The main-line circuit is not brought to or near the handpiece, our handpiece attachment being only connected up with the local-battery circuits, thus avoiding all danger of shocks to the operator or patient. All of the parts are of simple and economical construction and not liable to excessive wear or damage with ordinary use.

Having thus fully described our invention, what we claim as new, and desire to secure by Letters Patent of the United States, is—

1. An electric engine provided with a handpiece and located in a main circuit, in combination with a main-circuit closer, a pole-changer in the main circuit, and attachments to the handpiece for operating respectively, the main-circuit closer and pole-changer, substantially as described.

2. An electric engine provided with a handpiece, in combination with a resistance-controller in the main circuit, and an attachment to the handpiece for operating the resistance-controller, substantially as described.

3. An electric engine provided with a handpiece, in combination with a main-circuit closer, a resistance-controller in the main circuit and an attachment to the handpiece for operating the main-circuit closer and resistance-controller, substantially as described.

4. An electric engine provided with a handpiece, in combination with a pole-changer and a resistance-controller in the main circuit, and attachments to the handpiece for operating the pole-changer and resistance-controller, respectively, substantially as described.

5. An electric engine provided with a handpiece, in combination with a main-circuit closer, a local current for operating the main-circuit closer, and a circuit-closer for the local circuit attached to the handpiece, substantially as described.

6. An electric engine provided with a handpiece, in combination with a pole-changer, for the main circuit, a local current for operating the pole-changer, and a circuit-closer for the local circuit attached to the handpiece, substantially as described.

7. An electric engine provided with a handpiece, in combination with a main-circuit closer, a pole-changer for the main circuit, local circuits for operating the main-circuit closer and pole-changer respectively, and circuit-closers for said local circuits attached to the handpiece, substantially as described.

8. An electric engine provided with a handpiece, in combination with a main-circuit closer, a resistance-controller operated by the main-circuit closer, a local circuit for operating the main-circuit closer, and a circuit-closer for the local circuit attached to the handpiece, substantially as described.

9. An electric engine provided with a handpiece, in combination with a resistance-controller in the main circuit, a main-circuit closer for operating the resistance-controller, a pole-changer in the main circuit, local circuit for operating the main-circuit closer and pole-changer, and circuit-closers for the local circuits attached to the handpiece, substantially as described.

10. An electric engine provided with a pole-changer, and a resistance-controller in the main circuit, a handpiece attachment for operating the resistance-controller, a local circuit for operating the pole-changer, and a circuit-closer for said local circuit attached to the handpiece, substantially as described.

11. An electric engine provided with a handpiece, in combination with a circuit-closer for the main circuit comprising electromagnets in a local circuit, an armature therefor forming part of the main circuit when closed and a circuit-closer for the local circuit attached to the handpiece, substantially as described.

12. An electric engine provided with a handpiece, in combination with a pole-changer comprising electromagnets in a local circuit, an armature therefor forming part of the main circuit when closed, and a circuit-closer for the local circuit, attached to the handpiece, substantially as described.

13. An electric engine provided with a handpiece, in combination with a main-circuit closer comprising electromagnets in a local circuit, an armature therefor forming part of the main circuit when closed, a pole-changer comprising electromagnets on another local circuit, an armature therefor forming part of the main circuit when closed, and circuit-closers for the local circuits attached to the handpiece, substantially as described.

14. An electric engine provided with a handpiece, in combination with a resistance-controller comprising electromagnets connected up in the main circuit, an armature therefor for operating the resistance-controller, a main-circuit closer, a local circuit for operating the main-circuit closer, and a circuit-closer for the local circuit attached to the handpiece, substantially as described.

15. An electric engine provided with a handpiece, in combination with a series of resistances, a resistance-controller for bringing all or part of said resistances into the main circuit, a main-circuit closer for operating the resistance-controller, and a handpiece attachment for operating the main-circuit closer, substantially as described.

16. An electric engine provided with a handpiece, in combination with a main-circuit closer, a pole-changer, a local battery in two divisions connected together electrically, and with the main-circuit closer and pole-changer, and a handpiece attachment for closing the circuit from one division of the battery through the main-circuit closer and from the other division of the battery through the pole-changer, substantially as described.

17. An electric engine provided with a handpiece, in combination with a main-circuit closer, a pole-changer in the main circuit, local circuits for operating the main-circuit closer and pole-changer, and a handpiece attachment comprising a push-button for closing the local circuit for the main-circuit closer, and a switch-lever for closing the local circuit for the pole-changer, substantially as described.

18. A handpiece attachment for an electric engine comprising a block of insulating material, means for clasping it upon the handpiece, and circuit-closing devices for a local circuit, substantially as described.

19. A handpiece attachment for an electric engine comprising a block of insulating material, means for clasping it upon the handpiece, and a plurality of circuit-closers for local circuits, substantially as described.

20. A handpiece attachment for an electric engine comprising a block of insulating material, means for clasping it upon the handpiece, a longitudinal metal bar extending through the block, a metal rod connected to the bar and projecting from the top of the block, a switch-lever on said rod, and a curved rod extending from the end of the bar through it, and out of its top within contact of the switch-lever, substantially as described.

21. A handpiece attachment for an electric engine, comprising a block of insulating material, means for attaching it to the handpiece, a longitudinal metal bar extending through the block, a metal rod connected to the bar and projecting from the top of the block, a switch-lever on the rod, a contact-bar for the switch-lever extending through the end of the block, a parallel longitudinal bar in the block, and a push-button for electrically connecting the two longitudinal bars, substantially as described.

22. A main-circuit closer, for an electric engine comprising oppositely-located pairs of binding-posts in the main circuit, pins electrically connected with the respective binding-posts of the pairs, electromagnets in a local circuit, an armature therefor adapted to contact with the pins when the local circuit is closed, plates in the main circuit, and contact-pins on the armature engaging said plates, substantially as described.

23. A main-circuit closer for an electric engine comprising electromagnets 35, 36 in a local circuit, the pivoted armature 37, the platinum-faced blocks 39, 40 projecting from said armature, the pins 41, 42 on the positive and negative sides of the main circuit, the plates 45, 46 in the negative and positive sides of the main circuit, and the pins 43 and 44 passing through the armature and blocks 39, 40 and contacting with said plates, substantially as described.

24. A resistance-controller for an electric engine comprising electromagnets in the main circuit, an armature therefor normally held away from the magnets, a pneumatic cylinder, a plunger therein normally held raised, a contact-point carried by and a series of notches in said plunger, a series of stationary contact-points adjacent to the plunger, and pawls carried by the armature and engaging the notches of the plunger, substantially as described.

25. A resistance-controller for an electric engine comprising electromagnets connected up in series in the main circuit, an armature normally held away from the magnets, a pneumatic cylinder, a plunger therein normally held raised, a contact-point in the main circuit carried by and a series of notches in said plunger, a series of stationary contact-points adjacent to the plunger and connected up with resistances, pawls carried by the armature and engaging the notches of the plunger, and means for admitting and discharging air from the pneumatic cylinder, substantially as described.

HENRI LETORD.
JOSEPH S. LETORD.

Witnesses:
J. N. McELROY,
JAMES G. SMITH.